Patented Aug. 15, 1939

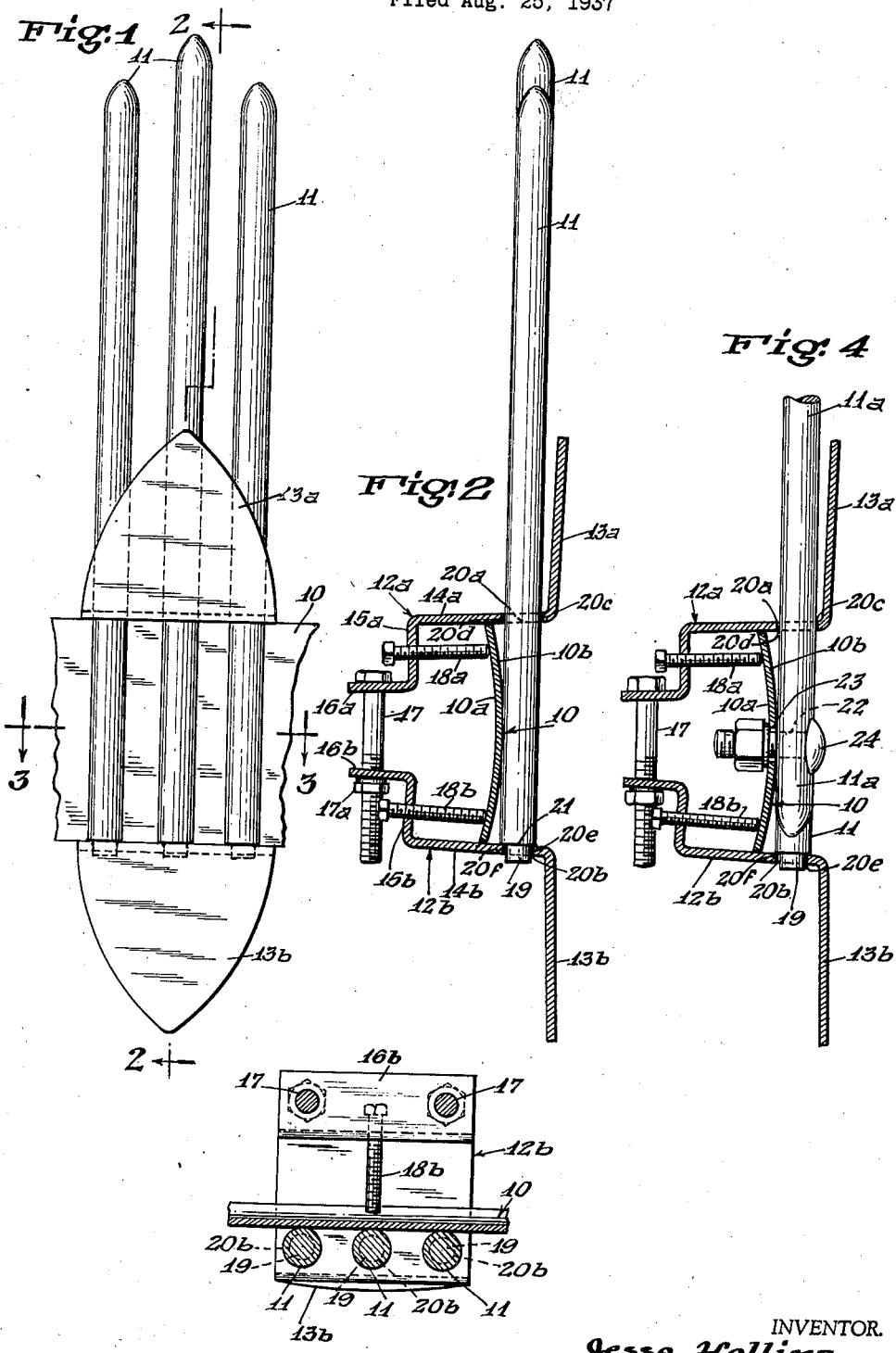

2,169,695

UNITED STATES PATENT OFFICE 2,169,695

GRILLE GUARD

Jesse Hollins, Brooklyn, N. Y.

Application August 25, 1937, Serial No. 160,743

2 Claims. (Cl. 293—55)

This invention relates to improvements in automobile radiator grille guards, being particularly directed to a mechanism applied to the bumpers of automobiles and disposed in advance of the grilles thereof for the purpose of protecting the latter from contact with foreign objects.

It is an object of this invention to provide a grille guard firmly mounted and upstanding from the bumper of a vehicle and serving to protect that portion of the grille of the vehicle above the level of the bumper from shock or contact.

These and other advantages, capabilities and features of the invention will appear from the subjoined detailed description of one specific embodiment thereof illustrated in the accompanying drawing, in which Figure 1 is a front elevation of the grille guard.

Figure 2 is a side elevation taken in section along lines 2—2 of Figure 1.

Figure 3 is a plan view in section taken along lines 3—3 of Figure 1.

Figure 4 is a side elevation, partly in section, of a modified form of grille guard.

Referring to the reference characters in the drawing, numeral 10 represents a cross-section of a bumper which extends vertically in advance of the radiator and upon which is mounted the grille guard as shown.

The grille guard comprises of a series of grille bars 11, shown here as disposed parallel to one another and adapted to be disposed in advance of the bumper and supported and locked in grille support plates 12a and 12b. The respective grille support plates are substantially identical in construction and disposed in opposite vertical relationship, each grille support plate comprising of an integral formed right-angular zigzag element.

As formed for assembly, the grille plates respectively have vertically extending front decorative sections 13a and 13b, horizontally extending supporting sections 14a and 14b, vertically extending sections 15a and 15b, for passage of bumper fastening members and horizontally extending sections 16a and 16b for supporting interlocking members for the same.

As shown in Figures 2 and 3, in assembling the grille guard, the zigzag support plates 12a and 12b are disposed respectively above and below the bumper 10, and locking bolt and nut assembly 17 passed through apertures in sections 16a and 16b of the grille plates to interlock the same. A plurality of set screws 18a and 18b extending horizontally are passed through threaded apertures of sections 15a and 15b of the respective grille plates and adapted to have their free ends press against and lock with the rear face 10a of the bumper.

Grille bars, which in the embodiment shown are cylindrical in conformation and having a reduced leg portion 19, are passed through aperture 20a of plate member 12a, the perimeter of the aperture being greater than that of the grille bar, so that reduced leg 19 of the same rests in aperture 20b of lower plate member 12b, said aperture 20b being slightly larger than the perimeter of leg 19, but smaller than the perimeter of shoulder 21 of the grille bar, which rests against the inner face of said lower plate section; in this manner, respective grille bars which may or may not be of the same length, are disposed in parallel relationship in advance of front face 10b of the bumper.

To firmly assemble the grille guard with respect to the bumper, the sections 16a and 16b are drawn towards each other by tightening nut 17a of bolt 17, so that the respective vertical and horizontal faces or sections of grille plates 12a and 12b are angularly displaced from normal and the set screws 18a and 18b are tightened so that their free ends firmly grip the rear face 10a of the bumper. By this clamping action aforesaid, surfaces 20c and 20d on diametrically opposite faces of section 14a defining aperture 20a are caused to form a clamping or gripping action against the peripheral surface of the grille bar passing through said aperture.

Similarly, diametrically opposite peripheral surfaces 20e and 20f of plate section 14b defining aperture 20b are caused to form a clamping and gripping action against the peripheral surface of neck 19 of the grille bar, thus preventing vertical or lateral displacement of the grille bars.

In the modification shown in Figure 4, an additional clamping mechanism for the grille guard to the bumper is disclosed, wherein one of the grille bars, particularly the center one 11a thereof, has a horizontal aperture 22 adjacent horizontal aperture 23 of the bumper 10, and through which passes the bolt and nut assembly 24 to lock the grille guard to the bumper in conjunction with the other locking mechanisms heretofore described.

It is obvious that various changes and modifications may be made to the details of construction without departing from the general spirit of the invention as set forth in the appended claims.

I claim:

1. In a radiator grille guard applied to an automobile bumper, a plurality of support elements having opposing apertures forming a partial enclosure for said bumper, upstanding spaced grille bars passing through the apertures of, and carried on said support elements, and forming with the same, an enclosure for said bumper, means acting on said support elements for interlocking the support elements and said grille bars, and means for locking the interlocked support element and grille bar assembly to said bumper.

2. In a radiator grille guard applied to an automobile bumper a plurality of support elements having opposing apertures forming a partial enclosure for said bumper, upstanding spaced grille bars passing through the apertures of and carried on said supports, and forming with the same an enclosure for said bumper, means connecting the supporting elements and serving upon actuation to displace the same from supporting to gripping and interlocking association with said grille bars, and means for locking the interlocked support and grille bar assembly to said bumper.

JESSE HOLLINS.